(12) United States Patent
Lai

(10) Patent No.: US 7,693,489 B2
(45) Date of Patent: Apr. 6, 2010

(54) METHOD AND APPARATUS FOR MIGRATING SEAMLESSLY IN A WIRELESS COMMUNICATION SYSTEM

(75) Inventor: Wei-Tin Lai, San Chung (TW)

(73) Assignee: Qisda Corporation, Taoyuan County (TW)

(*) Notice: Subject to any disclaimer, the term of this patent is extended or adjusted under 35 U.S.C. 154(b) by 950 days.

(21) Appl. No.: 11/479,028

(22) Filed: Jun. 30, 2006

(65) Prior Publication Data

US 2007/0002797 A1    Jan. 4, 2007

(30) Foreign Application Priority Data

Jul. 1, 2005    (TW)    ................ 94122373 A

(51) Int. Cl.
*H04B 1/00* (2006.01)
(52) U.S. Cl. .................. 455/63.3; 455/63.1; 455/78; 455/77; 455/199.1; 370/244; 375/254
(58) Field of Classification Search ......... 455/63.3, 455/63.1, 78, 77, 199.1, 192, 1, 192.3; 370/244, 370/250, 323, 360; 375/254, 296
See application file for complete search history.

(56) References Cited

U.S. PATENT DOCUMENTS

| | | | | | |
|---|---|---|---|---|---|
| 4,388,731 | A | * | 6/1983 | King ........................ 455/221 |
| 5,465,269 | A | * | 11/1995 | Schaffner et al. ........... 375/144 |
| 5,500,878 | A | * | 3/1996 | Iwasaki ..................... 375/344 |
| 5,715,530 | A | * | 2/1998 | Eul ........................... 455/306 |
| 6,266,361 | B1 | * | 7/2001 | Huang et al. ............... 375/140 |
| 6,430,211 | B1 | * | 8/2002 | Aiello ....................... 375/135 |
| 6,785,271 | B2 | * | 8/2004 | Eum .......................... 370/379 |
| 7,006,529 | B2 | * | 2/2006 | Alastalo et al. ............ 370/468 |
| 7,023,941 | B1 | * | 4/2006 | Rey et al. .................. 375/355 |
| 7,024,172 | B1 | * | 4/2006 | Murphy et al. ............. 455/324 |
| 7,068,089 | B2 | * | 6/2006 | Soe ........................... 327/262 |
| 7,146,636 | B2 | * | 12/2006 | Crosbie ..................... 726/7 |
| 7,218,894 | B2 | * | 5/2007 | Schmidl et al. ............ 455/67.11 |
| 7,289,587 | B2 | * | 10/2007 | Rentschler et al. ......... 375/362 |
| 7,336,645 | B2 | * | 2/2008 | Hur et al. .................. 370/350 |
| 7,366,202 | B2 | * | 4/2008 | Scherzer et al. ............ 370/480 |
| 7,417,971 | B2 | * | 8/2008 | Jeong et al. ................ 370/331 |
| 7,486,616 | B2 | * | 2/2009 | Kitchin ...................... 370/228 |
| 7,554,338 | B2 | * | 6/2009 | Nara ......................... 324/613 |
| 7,606,138 | B2 | * | 10/2009 | Wang et al. ................ 370/210 |
| 2001/0047424 | A1 | * | 11/2001 | Alastalo et al. ............ 709/236 |
| 2002/0085719 | A1 | * | 7/2002 | Crosbie ..................... 380/248 |
| 2004/0081144 | A1 | * | 4/2004 | Martin et al. .............. 370/360 |
| 2004/0109441 | A1 | * | 6/2004 | Hur et al. .................. 370/352 |

(Continued)

*Primary Examiner*—Minh D Dao

(57) ABSTRACT

A wireless communication system includes: an access point used the first channel or second channel to transmit the data, wherein the center frequency of the first channel is an initial frequency and the center frequency of the second channel is an target frequency; and a client terminal. When the client terminal receives the data from the first channel, the access point and the client terminal are operated by a first working frequency and second working frequency respectively. Initially, both working frequencies are located at the initial frequency. When the first channel is desired to switch to the second channel, the first working frequency is added an offset frequency. The second working frequency is adjusted and followed so as to keep up with first working frequency. By adding the offset frequency to the working frequency repeatedly, the first and second working frequencies are shifted until both of them arrive at the target frequency.

16 Claims, 4 Drawing Sheets

U.S. PATENT DOCUMENTS

| | | | |
|---|---|---|---|
| 2005/0128982 A1* | 6/2005 | Kitchin | 370/332 |
| 2005/0233746 A1* | 10/2005 | Laroia et al. | 455/436 |
| 2005/0264335 A1* | 12/2005 | Soe | 327/261 |
| 2006/0250935 A1* | 11/2006 | Hamamoto et al. | 370/203 |
| 2007/0191005 A1* | 8/2007 | Cooper et al. | 455/434 |
| 2008/0122273 A1* | 5/2008 | Reitmann et al. | 297/217.3 |
| 2008/0146165 A1* | 6/2008 | Young et al. | 455/76 |
| 2008/0227401 A1* | 9/2008 | Scherzer et al. | 455/67.13 |
| 2009/0135780 A1* | 5/2009 | Kitchin | 370/329 |
| 2009/0140920 A1* | 6/2009 | Frigon et al. | 342/368 |
| 2009/0156165 A1* | 6/2009 | Raghothaman et al. | 455/411 |
| 2009/0276639 A1* | 11/2009 | Saha et al. | 713/300 |
| 2009/0279587 A1* | 11/2009 | Eriksson et al. | 375/133 |

* cited by examiner

METHOD AND APPARATUS FOR MIGRATING SEAMLESSLY IN A WIRELESS COMMUNICATION SYSTEM

FIELD OF THE INVENTION

The invention relates to a communication system, more particularly to a seamless wireless communication system for transmitting video/audio signals.

BACKGROUND OF THE INVENTION

In the near future, WLAN (Wireless Local Area Network) is going to play an important role in our home and daily life. The user can enjoy media, data, and signal everywhere in home by using the WLAN. For the consumer, the access to the entertainment and Internet (information) is not bound by the harnesses of the wired network since the wireless signals can transmit every location on the face of the earth. The consumer will be able to access the Internet even from a car garage or lawn of a house.

Once a wireless communication system was set up in a house, and displays equipped with wireless transmitters and receivers for accessing the data from the any audio/visual instruments. For example, a TV had a transmitter and a receiver in the bedroom can receive the data from a PC or a video/audio recorder provided with wireless signal. As a matter of fact, the audio/visual digital transmission instrument generally includes a display (serving as a client), a remote control and a signal source (serving as an access point). The display and the signal source have the function of transmitting and receiving wireless signals.

When the consumer is watching a program, in case there is some signal interference that causes flickering or blurring of the image being displayed, he or she can press the remote control to transmit a command signal to the signal source in order to switch to another channel. For example, in IEEE 802.11b, the channel frequency can switch from the present frequency 2.412 GHz to the other channel frequency 2.462 GHz. As for 802.11a, the present channel frequency 5200 GHz is switched to the other channel frequency 5280 GHz.

In 802.11 standard, when it is desired to switch a channel to another channel, the signal source and the display are disassociated completely first and later connected again. Such a process results in loss of signal for a relatively short time and inconvenient to the consumer's visual.

Therefore, the object of the present invention is to provide a seamless wireless communication system such that no interruption of signal transmission during changing of one channel to the other channel.

SUMMARY OF THE INVENTION

The object of the present invention is to provide a wireless communication system to eliminate from the transmitted data delayed during switching channels.

The object of the present invention is to provide a method for migrating wireless channels seamlessly without interruption of data transmission during changing of one channel to the other channel by repetitively adding the offset frequency.

A wireless communication system is disclosed in the present invention. The wireless communication system comprises a transmitter terminal (serving as an access point) and a receiver terminal (serving as a client) at least. The access point is transmitting to a signal in one of first or second channels, the first channel has a first center frequency defining an initial frequency, and the second channel has a second center frequency defining a target frequency. The client receives the signal via the first channel. The access point and the client are operated at first and second working frequencies respectively, and each of the first and second working frequencies is equivalent to the initial frequency. When the access point migrates from the first channel to the second channel, the first working frequency is added an offset frequency on the access point, and the second working frequency is adjusted the same with the first working frequency. The access point and the client add the offset frequency repetitively till the first and the second working frequency equivalent to the target frequency. During the process of adding the offset frequency repetitively, the client can receive the signal from the access point added the offset frequency due to the offset frequency much smaller than the working frequency. The data transmission will not be interrupted by migrating the channels.

In a second aspect of the present invention, a channel switching method is proposed for a wireless communication system that transmit a signal in one of first or second channels from an access point to a client, the first channel having a first center frequency defining an initial frequency, the second channel having a second center frequency defining a target frequency, the access point and the client being operated at first and second working frequencies respectively, each of the first and second working frequencies being equivalent to the initial frequency. The channel switching method includes the following steps: transmitting a switch command by the consumer; upon a receipt of the switch command, the access point transmitting a UDP (user data protocol) to the client in order to result in switching of the first working frequency to the target frequency; adding an offset frequency to the first working frequency of the access point and consequently informing the client an administration package of the first working frequency; upon receipt of the administration package, the second working frequency being adjusted in such a manner to be consistent with the first working frequency; the client transmitting a data package to the access point about the informing finishing of adjustment of the second working frequency; upon a receipt of the data package, the access point comparing to whether the first working frequency being equivalent to the target frequency; repeating above the steps in case the first working frequency being not equivalent to the target frequency; and stopping the channel switching operation once the first working frequency being equivalent to the target frequency.

The overlapping region between two adjacent channels is influenced the transmission signal of the two adjacent channels in the present invention. When the wireless communication system is designed, the channel switching method is added in the transmitter chip (access point) and the receiver chip (client). The method is use of the first and second working frequency cooperative adding the offset frequency repetitively to transmitting signal continuously during migrating the channels.

BRIEF DESCRIPTION OF THE DRAWINGS

The features, objects, and advantages of the present invention will become more apparent from the following detailed description of the preferred embodiment of this invention, with reference to the accompanying drawings, in which.

DETAILED DESCCRIPTIONS OF THE PREFERRED EMBODIMENT

Figure 1:
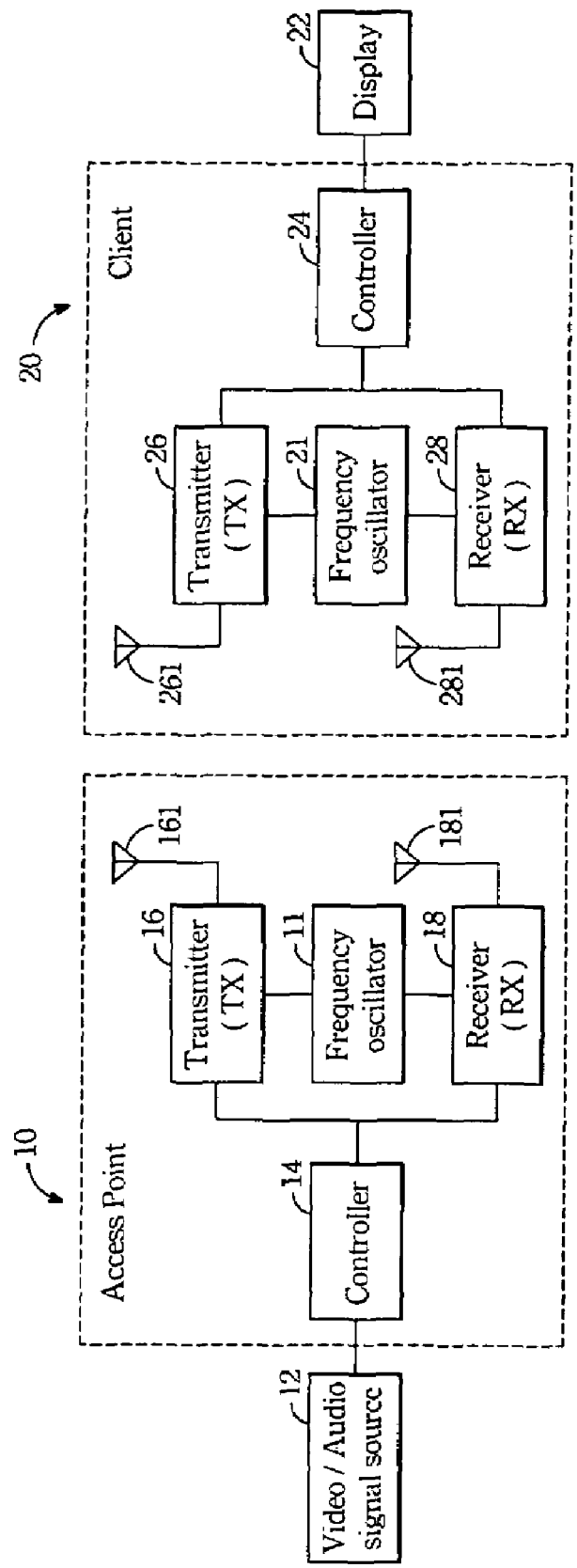
FIG. 1 illustrates a detailed viewed of the various components of the wireless communication system.

FIG. 1 is a preferred embodiment of a wireless communication system in accordance with the present invention. The wireless communication system includes a transmitter terminal 10 (serving as an access point) and a receiver terminal 20 (serving as a client) at least. The access point 10 comprises a frequency oscillator 11, a controller 14, a transmitter 16, a transmitter antenna 161, a receiver 18, and a receiver antenna 181. The access point 10 connects to a video/audio signal source 12 to transmit the video/audio signal from the video/audio signal source 12 to the controller 14. The video/audio signal processed by the controller 14 is transmitted by the transmitter 16 via the transmitter antenna 161. The receiver 18 receives signals from a remote control or the client via the receiver antenna 181. The frequency oscillator 11 can adjust the frequency to assist the access point 10 in carrying out channel switching.

The client 20 comprises a frequency oscillator 21, a controller 24, a transmitter 26, a transmitter antenna 261, a receiver 28, and a receiver antenna 281. The client 20 receives signal from the access point 10 via the receiver antenna 281. The signal processed by the receiver 28 and the controller 24 is transmitted to a display 22 to show the video/audio signal. The client 20 depends on the frequency oscillator 21 to cooperate with the access point 10 to migrate the channels. The data of the channel switching is transmitted to the access point 10 by the transmitter antenna 261 of the transmitter 26.

Figure 2:
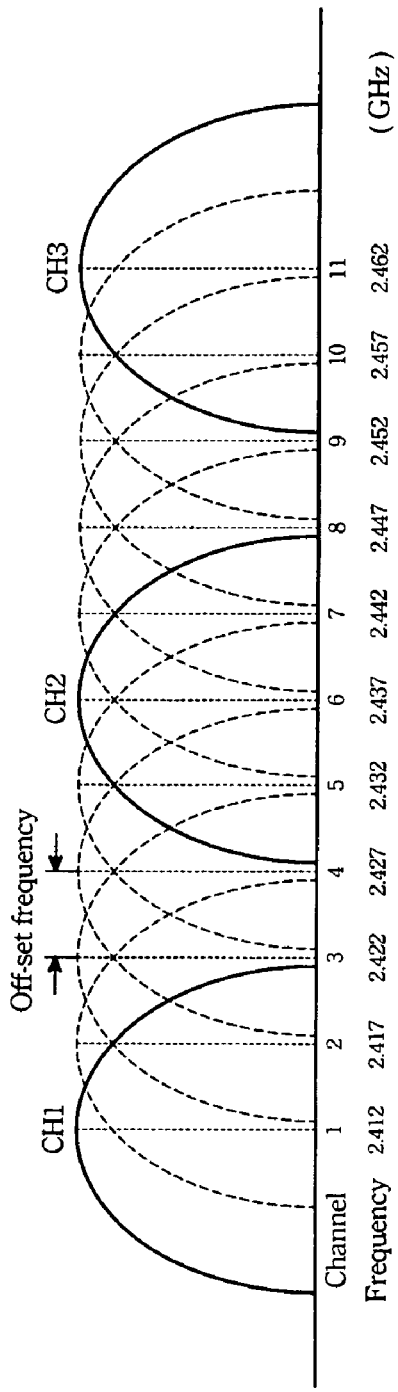
FIG. 2 is a first embodiment of the wireless communication system at 802.11b in accordance with the present invention.

Please refer the FIG. 2 that is a first embodiment of the wireless communication system at 802.11b in accordance with the present invention. When the access point and the client set the frequency in any center frequency of two channels respectively, the transmission signals between the access point and the client will not interfere with each other. When the transmission frequency of the access point is 2.412 GHz and the receiver frequency of the client is 2.437 GHz, the client can not receive the signal from the access point because the frequencies are different. The access point can not communicate with the client smoothly unless both of them are set in the same frequency.

The concept of the channel switching method is employing the overlapping frequency between two adjacent channels to set an offset frequency (also called an offset unit) smaller than the maximum of the overlapping frequency in the present invention. When the access is going to switch an adjacent channel, the working frequency of the access point will be added the offset frequency every time, and then the client adjusts cooperatively the working frequency to be the same with that of the access point to make the client receiving beacons ceaselessly. Such the access point and the client can accomplish the goal that switches from the initial frequency to the target frequency step by step.

The explanation of how the wireless communication system makes the channel switching at 802.11b is described as below. It is assumption that there are three non-overlapping frequencies 2.412 GHz, 2.437 GHz, and 2.462 GHz to be the center frequency of the first, second, and third channels respectively at 802.11b. The difference between the center frequencies of the adjacent channels divided by a nature number N is defined as the offset unit which is smaller than the maximum overlapping frequency of the adjacent channels. For instance, the nature number is 5, and the first channel 2.412 GHz subtracted from the center frequency of the second channel 2.437 GHz equals the difference between the adjacent channels 0.025 GHz. The difference between the adjacent channels 0.025 GHz divided by 5 equals 0.005 GHz (5 MHz) is defined as the offset frequency. The bandwidth of the two adjacent channels is partitioned into five frequency bands, and the gap between two adjacent frequency bands is the offset unit. For example, the first frequency band is 2.412 GHz, the second frequency band is 2.417 GHz, and so on.

The access point and the client are operated under a first and a second working frequencies respectively, and each of the first and second working frequencies is equivalent to the center frequency of the first channel 2.412 GHz. A consumer gives a switch command to the access point for channel switching from a remote control while the consumer feels the image quality influenced by some noise. Therefore the communicating frequency between the access point and the client are requested to migrate to a free channel which is assumed to be the second channel having a center frequency defining the target frequency.

Upon the access point receives the switch command for changing from the first channel to the second channel, the access point transmits a user data protocol (called UDP hereafter) to the client. The UDP includes the information about data and a notice of the channel switching for migrating the second working frequency of the client to the target frequency (second channel). Then the first working frequency of the access point is added with the offset frequency, and it means that the first working frequency changing from the first frequency band to the second frequency band. The first working frequency of the access point added with the offset frequency is formed with a new first working frequency. The access point transmits an administration package about the new first working frequency to the client. Upon receipt of the administration package, the client adjusts the second working frequency in such a manner to be consistent with the first working frequency. The client transmits a data package to the access point about the informing finishing of adjustment of the second working frequency. Upon a receipt of the data package, the access point compares to whether the first working frequency being equivalent to the target frequency or not. The first working frequency is not equivalent to the target frequency as a result of the first working frequency locating at the second frequency band not at the sixth frequency band, so the access point must adjust the first working frequency again to add the offset frequency. The access point and the client repeat the above steps in case the first and second working frequencies being not equivalent to the target frequency, and then the wireless communication system stops the channel switching operation once the first and second working frequencies being equivalent to the target frequency.

Thereof the access point communicates with the client during the process of the working frequency adjustment. When the access point has added the offset frequency but the client has not adjusted the second working frequency, the first and second working frequencies still are located in the region of the overlapping frequency. The access point and the client are not separated in two isolated channels, so the transmission data is also keeping smoothly.

Upon the data being a video/audio data, the access point transmits the video/audio data to the client continually when the first working frequency switched, and the client processes the video/audio data and adjusted the second working frequency at the same time. The video/audio data is showed in the display without the delay phenomenon.

If the nature number 5 is too small and causes the offset frequency too big, the client will not receive the correct data after adding the first working frequency and the offset frequency. It means that the first working frequency shifts too much, so the signal which the client receives is too weak to cooperatively adjust the second working frequency to the same with the first working frequency.

Figure 3:
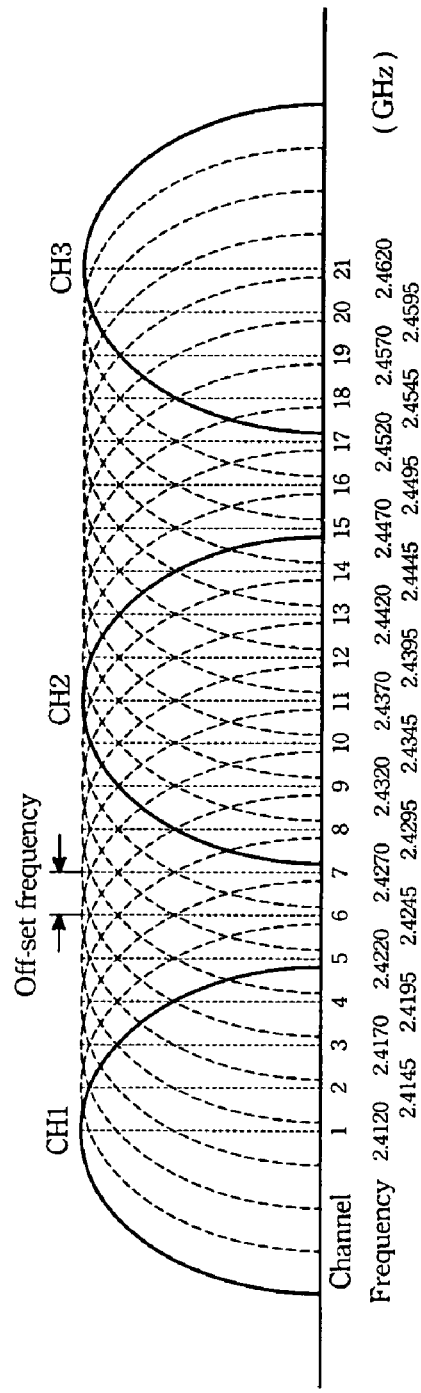
FIG. 3 is a second embodiment of the wireless communication system at 802.11b in accordance with the present invention.

In above status, the nature number is increased for decreasing the value of the offset frequency to avoid the transmission signal between the access point and the client too weak. Please refer the FIG. 3 that is a second embodiment of the wireless communication system at 802.11b in accordance with the present invention. For instance, the nature number is 10, and the first channel 2.412 GHz subtracted from the center frequency of the second channel 2.437 GHz equals the difference between the adjacent channels 0.025 GHz. The difference between the adjacent channels 0.025 GHz divided by 10 equals 0.0025 GHz (2.5 MHz) which is defined as the offset frequency. The bandwidth of the adjacent channels is partitioned into ten frequency bands, and the gap between two adjacent frequency bands is the offset unit. For example the first frequency band is 2.4120 GHz, the second frequency band is 2.4145 GHz, and so on.

The access point and the client are operated at a first and a second working frequencies respectively, and each of the first and second working frequencies is equivalent to the center frequency of the first channel 2.412 GHz. When the access point receives a switch command for channel switching, the wireless communication system follows the principle of the first embodiment to do the channel switching.

Figure 4A:
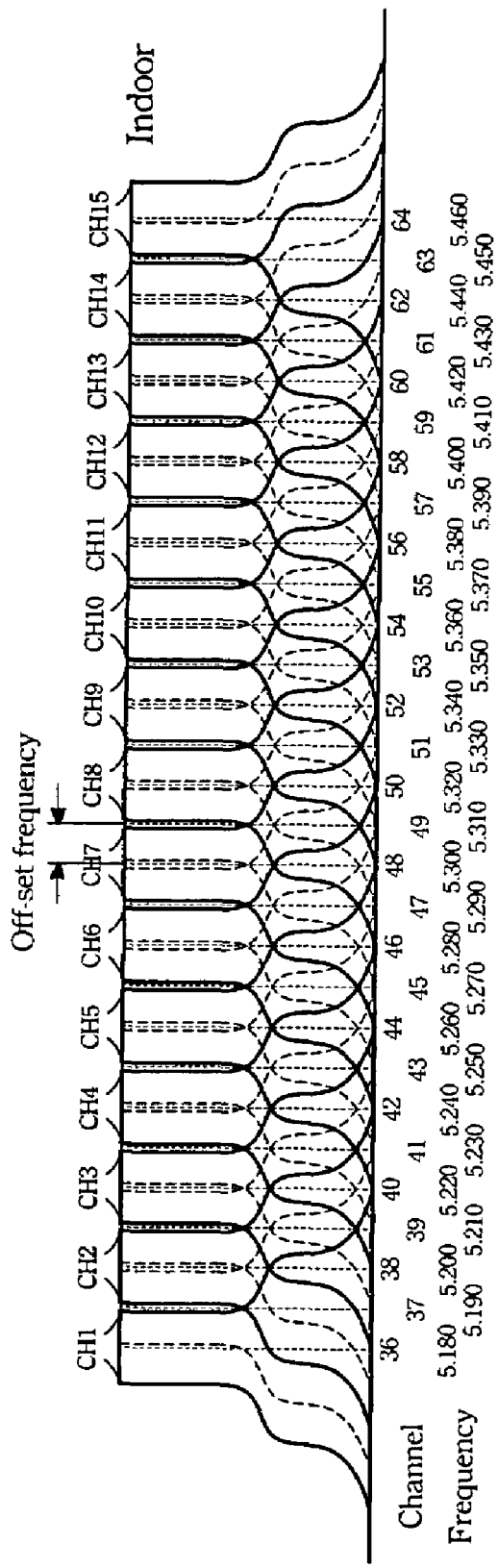
FIG. 4A is a third embodiment of the wireless communication system at 802.11a indoor in accordance with the present invention.
Figure 4B:
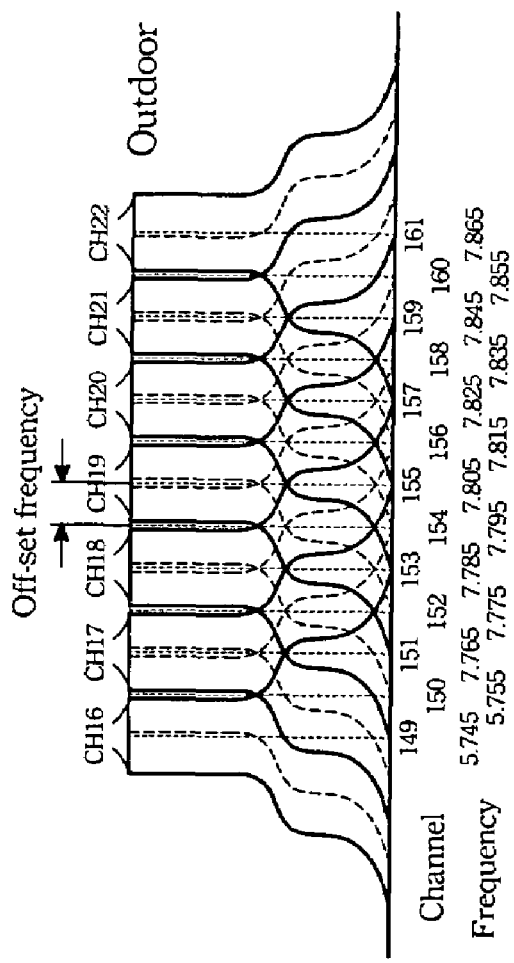
FIG. 4B is a fourth embodiment of the wireless communication system at 802.11a outdoor in accordance with the present invention.
Figure 5:
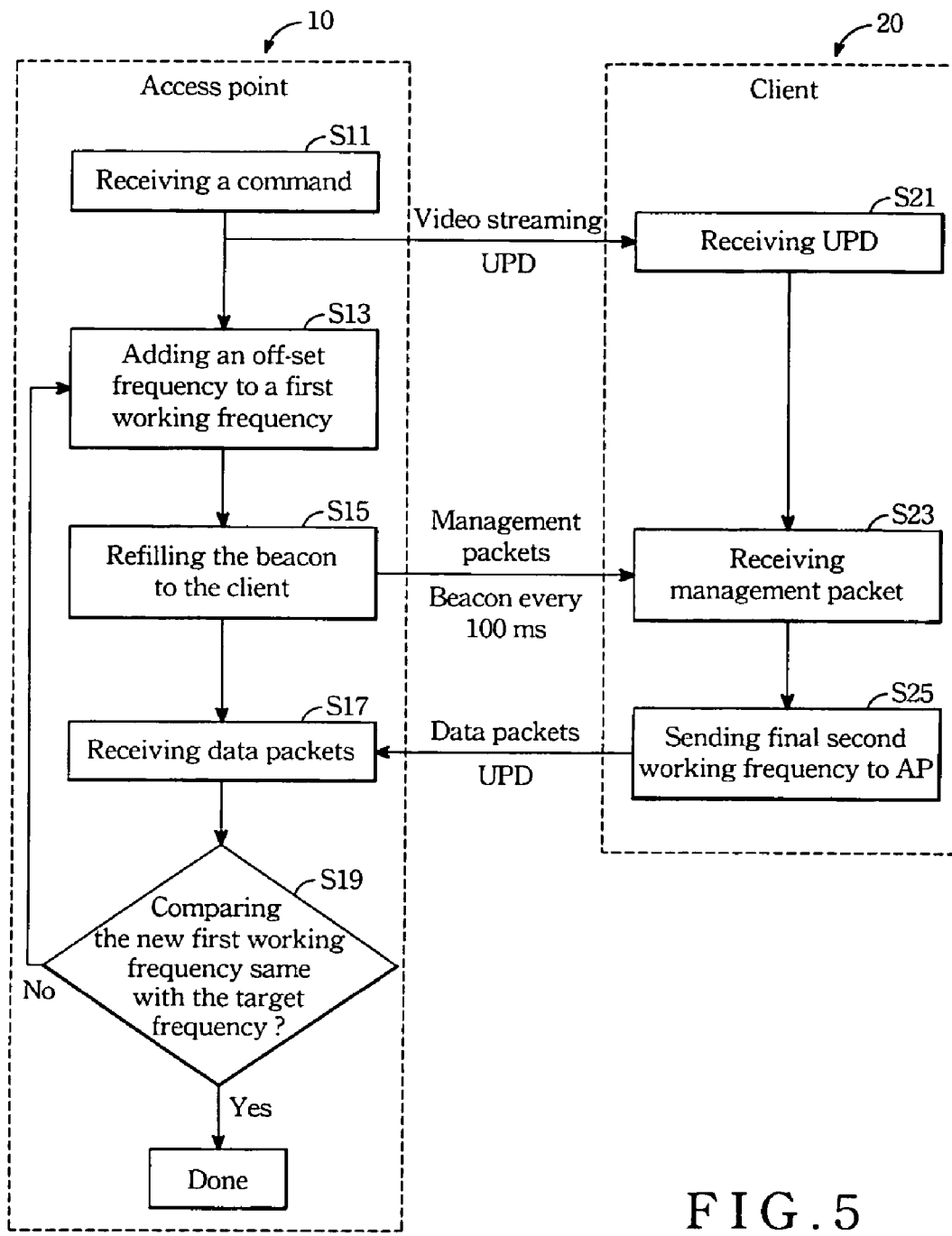
FIG. 5 is a flow diagram illustrating switched channels in the wireless communication system.

Please refer the FIG. 4, it illustrates a third and a fourth embodiments of the wireless communication system at 802.11a in accordance with the present invention. The 802.11a can be separated into an indoor frequency as illustrated in FIG. 4A and an outdoor frequency in FIG. 4B. The indoor frequency has non-overlapping fifteen channels from a center frequency of the first channel 5.180 GHz to a center frequency of the fifteenth channel 5.320 GHz. The outdoor frequency has non-overlapping seven channels from a center frequency of the sixteenth channel 5.745 GHz to a center frequency of the twenty-second channel 5.805 GHz.

The difference between the center frequencies of the adjacent channels divided by a nature number N is defined as an offset unit (also called offset frequency) which is smaller than the maximum overlapping frequency of the adjacent channels. For instance, the nature number is 2, and the first channel 5.180 GHz subtracted from the center frequency of the second channel 5.200 GHz equals the difference between the adjacent channels 0.02 GHz. The difference between the adjacent channels 0.02 GHz divided by 2 equals 0.01 GHz (10 MHz) is defined as the offset frequency. The bandwidth of the adjacent channels is partitioned into ten frequency bands, and the gap of two adjacent frequency bands is the offset unit such as the thirty-sixth frequency band 5.180 GHz, the thirty-seventh frequency band 5.190 GHz, and so on.

The wireless communication system at 802.11a follows the principle of the 802.11b embodiment to do the channel switching. However, in the 802.11a, the value of the offset frequency will not influence the video/audio quality during the channel switching just smaller than the maximum of the overlapping frequency. In the 802.11b, the value of the offset frequency makes the better video/audio quality and passes through the long distance, but the time of the channel switching costs longer.

Please refer the FIG. 4 that is a flow diagram illustrating switched channels in the wireless communication system in accordance with the present invention. The access point and the client are operated at first and second working frequencies respectively, and each of the first and second working frequencies is equivalent to the center frequency of the first channel. A consumer gives a switch command to the access point for channel switching from a remote control while the consumer feels the image quality influenced by some noise. Therefore the communicating frequency between the access point and the client are requested to migrate to a free channel which is assumed as the second channel having a center frequency defined the target frequency.

At step S11, upon the access point receives the switch command for changing from the first channel to the second channel, the access point transmits a UDP to the client. The UDP includes the information about data and a notice of the channel switching. At step S21, the client receives the UDP and prepares the second working frequency of the client for migrating to the target frequency (second channel). At step S13, the first working frequency of the access point is adding an offset frequency. At step S15, the access point transmits an administration package to the client. The administration package comprises a beacon which informs about the new first working frequency. At step S23, the client receives the administration package and compares the second working frequency in such a manner to be consistent with the first working frequency. If the second working frequency is not consistent with the first working frequency, the client adjusts the second working frequency in such a manner to be consistent with the first working frequency. At step S25, the client transmits a data package using the UDP form to the access point about the informing finishing of adjustment of the second working frequency. At step S17, the access point receives the data package. At step S19, the access point compares to whether the first working frequency being equivalent to the target frequency or not. If the first working frequency is not equivalent to the target frequency, the access point must adjust the first working frequency again. The access point and the client repeat the above steps in case the first and second working frequencies being not equivalent to the target frequency, and then the wireless communication system stops the channel switching operation.

Among the steps S15 to S23, if the region of the offset frequency is set too big, the client can not receive the correct administration package data. Then the wireless communication system reset to reduce the value of the offset frequency, and it means that the nature number N is amplified for minifying the offset frequency. The client receives the correct data due to the reduction offset frequency. During the process of the channel switching, the beacon transmits once every 100 microseconds to confirm the data communicating without interruption.

The present invention is employing the overlapping region between two adjacent channels influencing the transmission signal of the two adjacent channels. When the wireless communication system is designed, the channel switching method is added in the transmitter chip (access point) and the receiver chip (client). The method is use of the first and second working frequency cooperatively adding the offset frequency repetitively to transmitting signal continuously during the channel switching. The channel switching of the present invention is distinct from the channel switching of the prior art which is disassociated completely first and later connected again.

Although the present invention and its advantages have been described in detail, as well as some variations over the disclosed embodiments, it should be understood that various other switches, substitutions and alterations can be made herein without departing from the spirit and scope of the invention as defined by the appended claims.

What is claimed is:

1. A wireless communication system comprising:
   a transmitter for transmitting a data information by one of first and second channels, said first channel having a first center frequency defining an initial frequency, said second channel having a second center frequency defining a target frequency; and
   a client terminal for receiving said data information via said first channel, said transmitter and said client terminal being operable at a first and second working frequencies respectively, each of said first and second working frequencies being equivalent to said initial frequency wherein said transmitter migrate from said first channel to said second channel, said first working frequency adding an offset frequency on said transmitter, said second working frequency adjusted the same with said first working frequency, and said transmitter adding said offset frequency repetitively till said second working frequency equivalent to said target frequency.

2. The wireless communication system according to claim 1, wherein said offset frequency is smaller than the maximum value of overlapping frequency between said first and second channels cooperatively.

3. The wireless communication system according to claim 2, wherein said offset frequency is defined by the difference between said target and initial frequencies cooperatively divided by a first integer "N".

4. The wireless communication system according to claim 3, further comprising adding the value of said first integer when said client terminal is unable to receive the data information due correctly by said first working frequency adding said offset frequency.

5. The wireless communication system according to claim 1, further comprising a remote control for switching said first channel of said transmitter into said second channel.

6. The wireless communication system according to claim 1, wherein said first and second channels are located adjacent to each other.

7. The wireless communication system according to claim 1, wherein transmission of said data information from said transmitter to said client terminal is continued seamlessly during said first working frequency adding said off-set frequency.

8. The wireless communication system according to claim 1, wherein said client terminal includes a display, said data information being an image data information to be displayed over said display device after being processed, transmission of said image data information being continued seamlessly during switching from said first working frequency to said second working frequency.

9. A channel switching method of a wireless communication system that transmit a data information in one of first and second channels from an transmitter to a client terminal, said first channel having a first center frequency defining an initial frequency, said second channel having a second center frequency defining an target frequency, said transmitter and said client terminal being operated at first and second working frequencies respectively, each of said first and second working frequencies being equivalent to said initial frequency, the channel switching method comprising:
   (1) transmitting a switch command by a user;
   (2) the transmitter receiving the switch command and transmitting a UDP (user data protocol) to the client terminal in order to switch of said first working frequency to said target frequency;
   (3) adding an offset frequency to said first working frequency of said transmitter and consequently informing said client terminal;
   (4) said client terminal adjusting said second working frequency to be consistent with said first working frequency of said transmitter;
   (5) said client terminal transmitting a data package to said transmitter;
   (6) the transmitter receiving said data package and comparing to whether said first working frequency of said transmitter is equivalent to the target frequency;
   (7) repeating the steps (3) to (6) in case said first working frequency of said transmitter is not equivalent to the target frequency; and
   (8) stopping the channel switching operation once said first working frequency of said transmitter is equivalent to the target frequency.

10. The channel switching method according to claim 9, wherein said offset frequency is smaller than the maximum value of overlapping frequency between said first and second channels cooperatively.

11. The channel switching method according to claim 10, wherein said offset frequency is defined by the difference between said target and initial frequencies cooperatively divided by a first integer "N".

12. The channel switching method according to claim 11, wherein in the steps (3) and (4), further comprises a step of adding the value of said first integer when said client terminal is unable to receive the correct data information due to said first working frequency adding said offset frequency.

13. The channel switching method according to claim 9, wherein said switch command is to switch the first channel into the second channel.

14. The channel switching method according to claim 9, wherein transmission of said data information from said transmitter to said client terminal is continued seamlessly during above said steps.

15. The channel switching method according to claim 9, wherein the first and second channels are located adjacent to each other.

16. The channel switching method according to claim 9, wherein in the step (7), said first working frequency of said transmitter adding the offset frequency and second working frequency being adjusted in such a manner to be consistent with the new first working frequency of said transmitter, and the transmitter comparing said new first working frequency is equivalent to the target frequency and repeating the step (7) until said first working frequency is equivalent to the target frequency.

* * * * *